US006296213B1

(12) United States Patent

Law, III et al.

(10) Patent No.: US 6,296,213 B1

(45) Date of Patent: Oct. 2, 2001

(54) MULTIPLE MUSICAL INSTRUMENT STAND

(76) Inventors: Malcolm J. Law, III, 22 Lake of the Pines, East Stroudsburg, PA (US) 18302; Gary Parker, 100 South St., Camden, DE (US) 19934

( * ) Notice: Subject to any disclaimer, the term of this patent is extended or adjusted under 35 U.S.C. 154(b) by 0 days.

(21) Appl. No.: 09/437,944

(22) Filed: Nov. 10, 1999

(51) Int. Cl.[7] .................................................... F16M 11/38

(52) U.S. Cl. ........................ 248/166; 248/176.3; 248/461; 206/759; 206/45.2; 84/453

(58) Field of Search .................................... 248/461, 166, 248/176.1, 176.3; 206/736, 45.2, 759; 84/453; 211/85.6, 198, 204, 124

(56) References Cited

U.S. PATENT DOCUMENTS

| | | | |
|---|---|---|---|
| 1,051,047 * | 1/1913 | Wood . | |
| 1,774,096 | 8/1930 | Hasterok et al. . | |
| 1,986,703 * | 1/1935 | Baker . | |
| 2,058,184 | 10/1936 | Sherrard | 211/13 |
| 2,732,828 * | 1/1956 | Postel et al. . | |
| 3,958,786 | 5/1976 | Mann | 248/176 |
| 4,093,326 * | 6/1978 | Ford | 248/461 X |
| 4,352,480 | 10/1982 | Gathright | 248/443 |
| 4,474,290 * | 10/1984 | Demato | 206/45.2 X |
| 4,896,252 * | 1/1990 | Stewart | 248/461 X |

* cited by examiner

*Primary Examiner*—Anita King
*Assistant Examiner*—Korie Chan
(74) *Attorney, Agent, or Firm*—Duane, Morris & Heckscher

(57) ABSTRACT

A musical instrument stand holds at least one and preferably a number of musical instruments by a supporting structure that partly includes the structure of a case having top and bottom halves that are hinged together. The top and bottom halves are pivoted open to place the top half in a substantially vertical position where the top half holds a supporting yoke for holding an instrument, such as the neck of a guitar resting against a pad in the bottom half. A frame mounted to the case has two vertical legs mounted on the top half and a laterally extending support between the legs. Each leg is pivotally fastened in spaced relation to the other and is pivoted down for storage in the case or up to hold the lateral support and the instrument(s). In the pivoted-up position the legs snap resiliently into cutouts in a front edge of the top half, which provides part of the structural support for the instrument. The lateral support is coupled to and extends between the two legs at a selectable height. The respective parts are affixed frictionally by flanged split-cylinder clamping arrangements with threaded fasteners. The shaft portion of the instrument supporting yoke can form the threaded fastener for the flanged split cylinder that supports the instrument at the lateral support.

18 Claims, 6 Drawing Sheets

MULTIPLE MUSICAL INSTRUMENT STAND

FIELD OF THE INVENTION

The invention relates generally to instrument racks and stands for accessible temporary protection and support of one or more musical instruments. More particularly, a rugged traveling instrument stand is provided, particularly for performances. The stand is stored in and erectable from a case. The stand is configurable without tools to hold one or several musical instruments and/or instruments of different types.

BACKGROUND OF THE INVENTION

It is not uncommon for an entertainer, such as a rock or country musician, to switch between two or more instruments during the course of a performance. Having two or more instruments on stage presents a need temporarily to store unused instruments where they are accessible to be picked up quickly and played, perhaps being swapped with another instrument that is being set down. A similar problem is encountered when the musician takes a break and needs to place an instrument safely, where it will not fall over or obstruct movement, and where the instrument is readily accessible upon the musician's return.

The temporary storage problem applies to various types of musical instruments, such as electric and acoustic guitars, banjoes, mandolins, violins, saxophones, brass and the like. The instruments which a given performer or band may need to store temporarily but accessibly vary in attributes such as size, weight, shape, and accoutrements. Instruments may be relatively fragile. If they fall or are tripped over, the instruments are at risk of expensive damage, or perhaps impact or jarring that noisily disrupts a performance or puts the instrument out of tune.

Instruments can be casually laid down, often in an open instrument case, or propped up against a structure on stage. The instrument may be accessible there, but is at substantial risk. Space may be limited. Dangers are presented by movement of persons, props or equipment. The area may be cluttered by microphone stands, wires, monitor speakers and lighting, to say nothing of other performers and their instruments.

At the same time, live performances require quick transitions between songs, scenes and/or instruments. Periods of inaction (dead air) while waiting for a performer to pick up an instrument and poise to play must be avoided if at all possible. Competing structural and functional requirements apply. A temporary instrument support device should be compact and unobtrusive but it must hold one or more instruments in a cluttered environment at a position that is quick to hand. The device should provide unfettered access for picking up or putting down each instrument when needed, but must be substantial enough to prevent the instrument from falling over or suffering a damaging impact with a person or thing. For many musicians there is a further requirement that the temporary support stand be easily collapsed or disassembled, and sufficiently durable to survive rough handling, packing with other cases and equipment and transport between engagements.

Collapsible devices to be erected on site for accessible temporary storage of musical instruments are known. Storage, particularly in the performing environment, are well known in the art. Hasterok et al., U.S. Pat. No. 1,774,096, for example, discloses a musical instrument holder which provides accessible storage of a single instrument. Sherrard—U.S. Pat. No. 2,058,184—discloses a musical instrument storage rack for a multiple stringed instruments. This device appears to be primarily intended for use in a fixed environment such as a school, in that it is not readily collapsed or disassembled for shipment. Mann—U.S. Pat. No. 3,958,786—and Gathright—U.S. Pat. No. 4,352,480—disclose collapsible folding devices for the temporary storage of musical instruments, particularly stringed instruments.

The typical instrument holder in use by performers is a collapsible tripod-like arrangement. Two front legs are laterally spaced or collapsible together, and have forwardly protruding support hooks that reside under an instrument such as under the body of a guitar set upright on the holder. The third leg pivots rearwardly such that the three legs are spaced to provide a stable support. A telescoping vertical member terminates at the top in a forward facing padded U-shaped element in which the neck of the instrument rests. Variations on this concept are available in different sizes and structures adapted for different specific instruments (e.g., strings versus woodwinds, larger instruments versus smaller ones, etc.). These devices serve some of the needs of the performer for a transportable device that is unobtrusive and provides stable and readily accessible support. However there is room for improvement, because the typical instrument support holds only one instrument (except see the Gathright patent), lacks versatility as to how the instrument can be supported and positioned, is not collapsible for transport, or when collapsed is a spindly structure that is vulnerable to damage when transported among cases, speakers, microphone stands and the like.

SUMMARY OF THE INVENTION

The present invention provides a musical instrument stand adapted for holding at least one and preferably a number of musical instruments, which is highly durable, adjustable, and collapses into a case that forms part of the instrument supporting structure. The stand comprises a case having a top half and a bottom half that are hinged together by hinge means along one edge. The top half and the bottom half are pivotable away from one another about the hinge means and can be supported in a substantially upright position to define an open position of the case in which further supporting structures can be deployed. The top and bottom halves are pivotable toward one another about the hinge means in a closed position of the case wherein the supporting structures are collapsed into and stored in the case. The supporting structures include a preferably tubular frame is mounted to the case and comprises at least two substantially vertical legs and a lateral support. Each leg is preferably fastened to the top half of the case so as to pivot between a first substantially vertical position when the case is in the open position and the supporting structure deployed, and a second inwardly pivoted stowed position when the case is in the closed position. The support is removably coupled to and is fixedly attached between the two legs when the case is open. At least one instrument yoke is provided on the support and can be moved laterally and fixed at a desired lateral position for cradling a portion of a musical instrument. The instrument yoke can be configured in size or shape for a particular instrument, or a generic yoke can be used. Examples include a forward-facing U-shaped yoke to curve loosely behind the neck of an upright guitar or banjo, a sized yoke that may be wider to receive the bell of a saxophone or narrower to receive the peghead of a violin or mandolin. Instruments such as guitars can be rested on the other half (the horizontal half of the case. Other instruments such as violins can be wholly supported on or hung from the yoke on the lateral support.

The support is versatile in that the lateral support can be carried on right angle end fittings, or preferably on T-shaped end fittings permitting the support to be vertically positioned at any point on the legs and locked by threadably tightening a split-C clamping portion of the end fittings. The yokes on the support can likewise be placed at any desired position along the support and locked via a split-C clamp. In a preferred embodiment the yoke comprises a threaded shank that is threadably tightenable to lock the yoke in place against lateral displacement or rotation relative to the support.

BRIEF DESCRIPTION OF THE DRAWINGS

These and other features and advantages of the invention are further disclosed in, or rendered obvious by, the following detailed description of preferred embodiments of the invention, which are to be considered together with the accompanying drawings, wherein like numbers refer to like parts, and wherein.

DETAILED DESCRIPTION OF PREFERRED EMBODIMENTS

Figure 1:
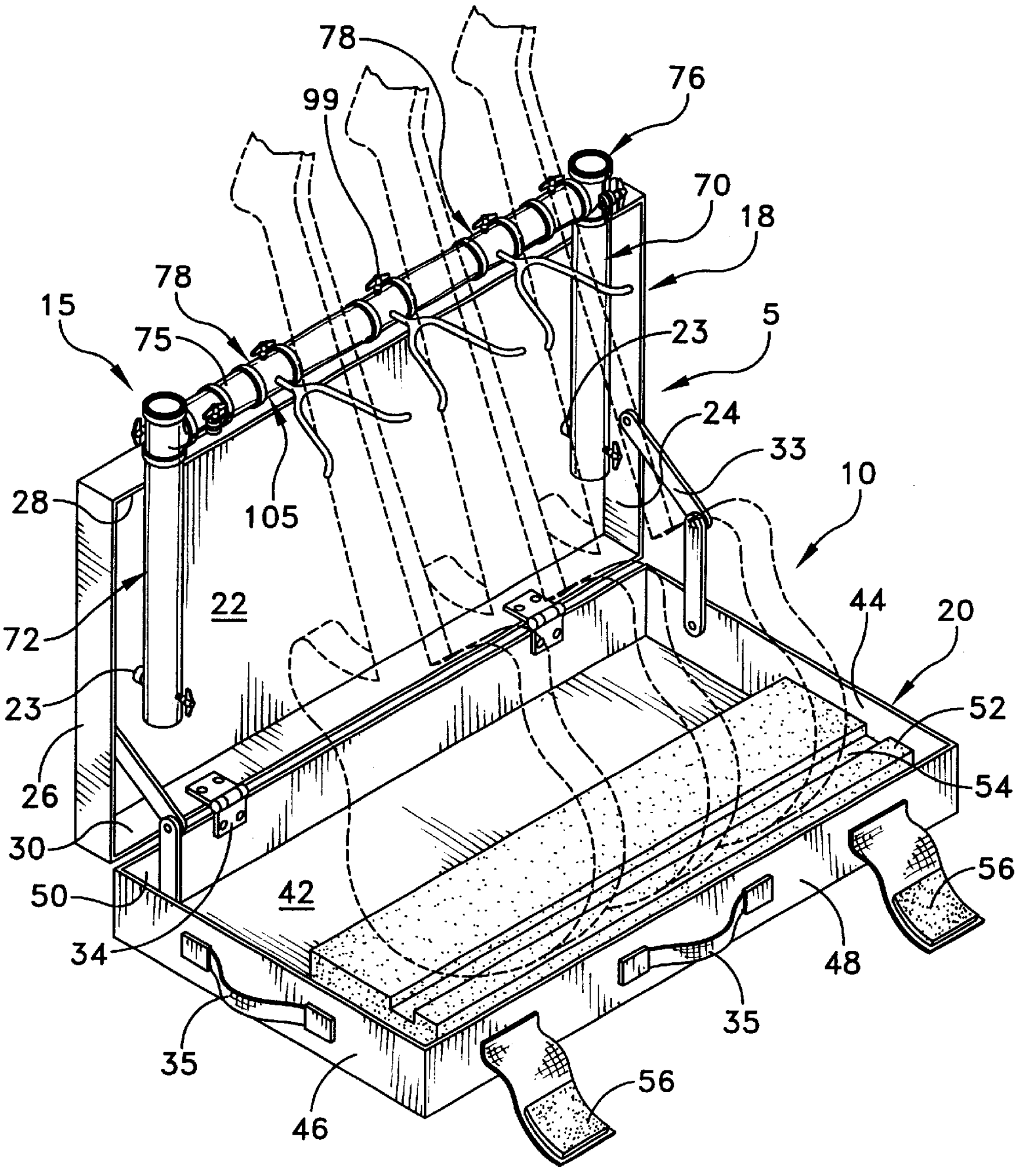
FIG. 1 is a perspective view of an embodiment comprising a multiple instrument stand in an open position, two forward facing instruments on the stand being shown in phantom lines.

This description of preferred embodiments of the invention is intended to be read in connection with the examples shown in the drawings comprising a portion of the entire written disclosure of the invention. In this description, terms such as horizontal, vertical, left, right, up, and down, etc., as adjectives or adverbs or their derivatives (e.g., horizontally, rightwardly, upwardly, downwardly, etc.) refer to the orientation of the structure of the invention as it is illustrated in the particular drawing figure or context, and is not intended to limit the invention to a particular orientation. Similarly, terms such as inwardly and outwardly generally refer to an orientation relative to an axis of elongation or axis of rotation, as appropriate. Terms such as connected and interconnected, when used in this disclosure to describe the relationship between two or more structures, means that such structures are secured or attached to each other either directly or indirectly through intervening structures and includes pivotal connections. The term "operatively" means that the foregoing direct or indirect connection between the structures allows such structures to operate as intended by virtue of such connection.

FIG. 1 shows a multiple musical instrument stand 5 comprising a case 10 whose hinged top and bottom form part of the structural support frame of the stand. Stand 5 includes case 10 and additional structural parts attached to case 10, and is adapted to support one or more musical instruments in an accessible manner. Preferably the case supports plural instruments and is configurable specifically for the instruments to be supported. The case is widely applicable to various different types of musical instruments that are advantageously placed conveniently near a performer to be picked up during a performance. The specific instruments can be in any of the strings, woodwinds, brass or percussion categories, including without limitation, guitars, banjoes, mandolins, violins, saxophones, flutes, clarinets, trumpets, etc.

Figure 6:
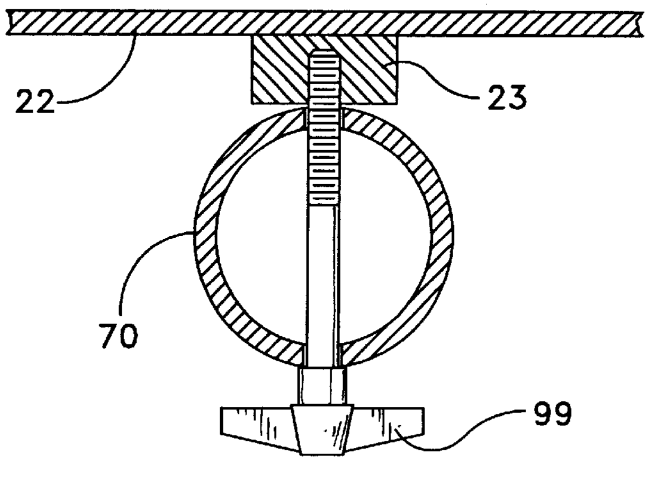
FIG. 6 is a cross-sectional view of a leg and fastening means along line 6—6 in FIG. 5; and, FIG. 7 is a front elevational view of the multiple musical instrument stand, similar to FIG. 4, but showing the legs in a folded position clear for closing the case.
Figure 8:
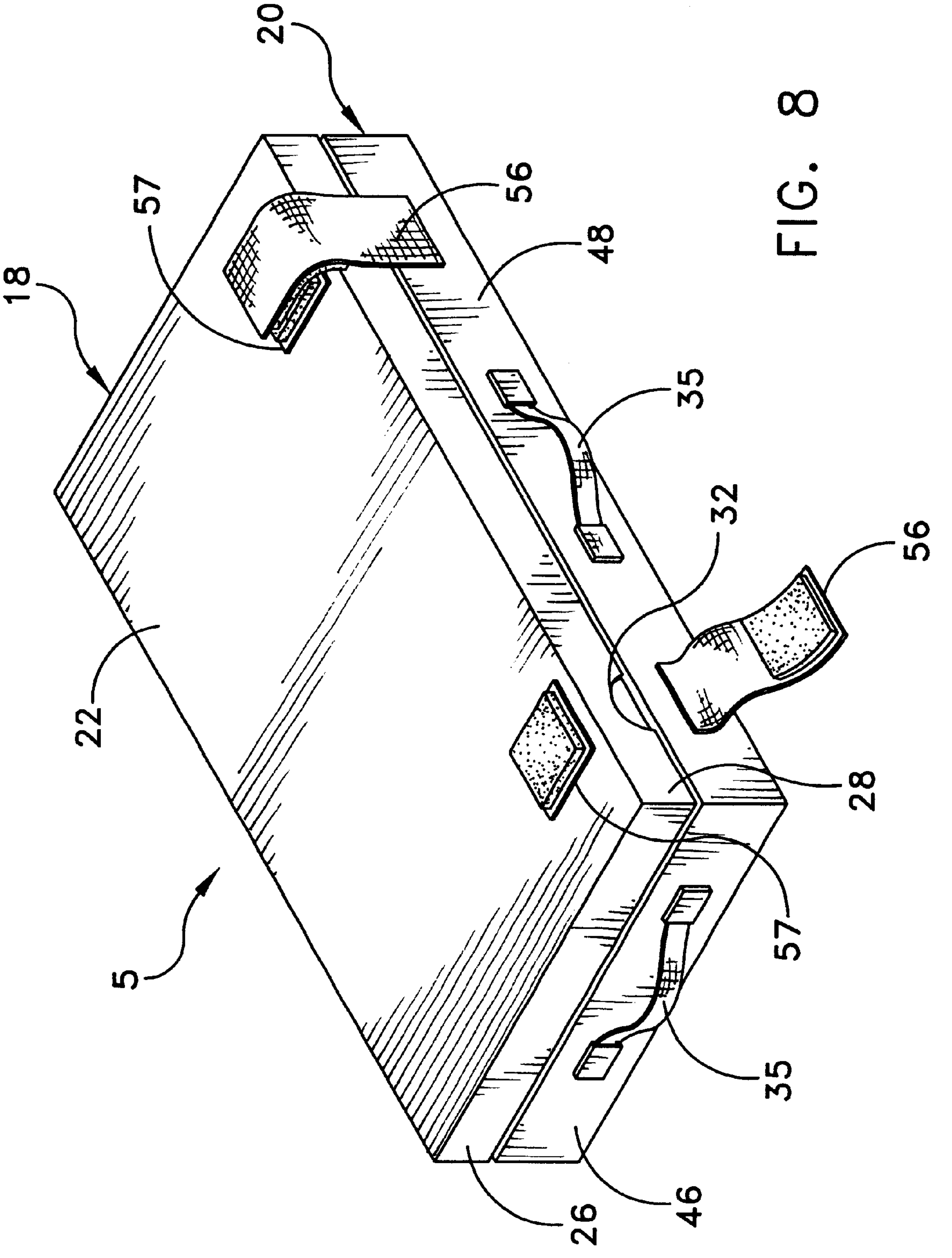
FIG. 8 is a perspective view of the multiple instrument stand shown in FIG. 1, but in a fully closed position.

Case 10 externally resembles a conventional instrument trunk or guitar case, namely generally defining a shallow hinged box having a generally rectangular cross-section, including a top half 18 and a bottom half 20. Top half 18 comprises a center panel 22, side walls 24,26, a front wall 28 and a rear wall 30. Center panel 22 can be, for example, about three to four feet long by about one to one and a half feet wide, which is the approximate size of an electric guitar case. A pair of spaced apart mounting brackets 23 are disposed on center panel 22 (see also FIG. 6), adjacent to rear wall 30, and are adapted to secure portions of a frame 15 to case 10, as described in detail below. Side walls 24, 26, front wall 28 and rear wall 30 project inwardly approximately one to two inches from the peripheral edge of center panel 22 so as to define roughly one third of the interior compartment of case 10, when case 10 is closed (FIG. 8). Other dimensions and proportions are equally viable without departing from the novel aspects of the invention.

Two semi-circular cut-outs 32 (best shown in FIG. 8) are defined to open at the edge of front wall 28, and are sized and shaped to receive a portion of frame 15. An upper half of a hinge locking linkage 33 is pivotally fastened to the inner surface of each side wall 24,26. Rear wall 30 includes means for fastening at least one hinge 34 to a top edge for pivotally attaching the top and bottom. The hinge locking linkage defines the maximum-open angle between the top and bottom, namely when the two halves of locking linkage 33 are co-linear, which is preferably approximately 90°, e.g., slightly more than 90°.

Bottom half 20 likewise comprises a center panel 42, side walls 44, 46, a front wall 48 and a rear wall 50. Center panel 42 is preferably about three to four feet long by about one to one and a half feet wide, namely the same size as the center panel 22 of the top. Side walls 44, 46, front wall 48 and rear wall 50 project inwardly approximately three to four inches from the peripheral edge of center panel 42 so as to define roughly two thirds of the interior compartment of case 10, when case 10 is in a closed position. Other dimensions and proportions are also viable without departing from the novel aspects of the invention, so long as top half 18 and bottom half 20 of case 10 are complementarily shaped and proportioned.

The lower half of locking linkage 33 is pivotally fastened to the inner surface of each side wall 44,46, adjacent to rear wall 50. The top edge of rear wall 50 includes corresponding means for fastening hinge 34. Locking linkages 33 and hinges 34 allow to top half 18 and bottom half 20 to be positioned in an open or closed configuration as shown in FIGS. 1 and 8. Case 10 may include a latch or lock (not shown) to maintain it in a closed position during shipment. Alternatively or in addition, hook/pile fastening straps 56 can be provided to attach the top and bottom in the closed position. These straps 56, which are shown attached to the bottom, engage receiving pads (not shown) on the top, or vice versa. Straps 56 are also sized and placed to cover over cutouts 32 when the top and bottom are closed.

A resilient pad 52 is disposed on center panel 42. Pad 52 can comprise, for example, an elastomer or foamed polymer pad. The pad defines a rectilinear block along the front portion of the bottom. The instruments held in the support can rest against the rear edge of the block and be positioned in a plane parallel to the front edge (shown in FIG. 1) or more densely in a position perpendicular thereto (not shown). In FIG. 1, pad 52 has an elongate slot 54 parallel to and adjacent to front wall 48. Slot 54 can be sized to receive a portion of a musical instrument, for example being as wide as the body of a guitar is thick. Other configurations for pad 52 can be employed for other instruments, such as a number of spaced discrete slots perpendicular to that shown in FIG. 1, each sized to hold the body of a guitar placed at 90° relative to the front edge. For other types of instruments, other forms for pad 52 are possible, such as semicircular indentations for the bottom curve of a saxophone, or other shapes that are complementary to the instrument. In a preferred embodiment, pad 52 is a solid rectilinear block of resilient foamed polymer, and any indentation in pad 52 occurs at the rear edge due to pressure of the instrument against pad 52 rather than due to a cutout portion.

Referring to FIGS. 1 and 8, a pair of straps or flaps 56 are affixed to the outer surface of front wall 48 in locations that correspond laterally to the locations of semicircular cut-outs 32 in front wall 28 of top half 18. Flaps 56 can include any releasable fastening means, such as snaps or belts. Preferably, flaps 56 employ hook and loop type fasteners (e.g., Velcro®) that are adapted to releasably engage corresponding fastening means 57 located adjacent to cut-outs 32 on top half 18. Flaps 56 can be permanently fixed on the bottom and removably fixed on the top, or vice versa, or flaps 56 can be removably fixed on both sides. At least one handle 35 may be disposed on side walls 44, 46 or front wall 48, or both.

Referring to FIGS. 1–7, frame 15 comprises a pair of substantially upright legs 70, 72 affixed to the case, at least one laterally elongated support 75 coupled between the legs via at least two support couplings 76, and at least one cradle assembly 78 for the instrument(s), movably positionable and fixable on support 75. Legs 70, 72 can comprise tubular lengths of light weight metal or a polymer (e.g., aluminum or polyvinyl chloride, or like materials) that are adapted for use as structural supporting members. Typically, legs 70, 72 are hollow, about one and a half to two feet long, and have an outer diameter of about one to about one and a half inches. Support 75 comprises a tubular length of light weight metal or polymer (e.g., aluminum or polyvinyl chloride, or the like materials) that is adapted for use as a structural supporting member. Typically, support 75 is hollow, about three and a half to four feet long, and has an outer diameter of about three and a half to about four inches, namely the same diameter as the legs.

Support couplings 76 can be elbows but preferably are tees to enable adjustment of the height of support 75 on the legs. In the embodiment shown, two relatively short, open-ended hollow cylinders 80, 82 are attached or are integral with one another such that their respective central axes are at right angles. Support couplings 76 form a rigid ninety degree joint between the abutting tubes, i.e., between each leg 70, 72 and support 75.

For fixing couplings 76 to legs 70, 72, each cylindrical portion 80, 82 of each support coupling 76 is split along a portion of its length to define a C-clamping structure whose diameter can be increased slightly to allow for coaxial mating of the cylinder with a leg 70, 72 or cinched down to frictionally lock coupling 76 to support 75 and legs 70, 72. A pair of confronting flanges 95 project outwardly from a side of each cylinder of support coupling 76 on either side of the split. Each flange 95 includes a through-bore 97, which through-bores are coaxially aligned. One of the through-bores 97 is a smooth bore for clearance and the other has an internal thread for accepting releasable fastening means 99, such as, thumb screws or the like. Other specific fasteners such as butterfly nuts can also be used, or the C-clamping structure can have a diameter adjusting hook and lever operated bail closure, etc.

The male and female nature of the connections for support 75 and legs 70, 72 can be varied in certain ways, provided a positioning adjustment is not needed. For example, where the extreme ends of support 75 are to reside at the upper ends of legs 70, 72, any male/female arrangement will work. Where support 75 is to be vertically adjustable on legs 70, 72 as shown, the leg side of the connection is male and the coupling side is female. Other variations are also possible, such as where support 75 is to be laterally adjustable or longer than the distance between legs 70, 72.

Cradle assembly 78 is adapted to receive and support a portion of a musical instrument, e.g., the neck of a guitar, that is leaned against or vertically suspended from the cradle assembly. Assembly 78 includes a yoke 100 and a yoke coupling 105. More particularly, yoke 100 comprises a pair of spaced guide fingers 110 and a coupling post 113 forming a "Y"-shaped part, or a U-shaped receptacle on a mounting shaft. Guide fingers 110 project outwardly from coupling post 113 and diverge laterally as the assembly is shown in FIG. 1. Yoke 100 comprises a light weight metal or polymer (e.g., aluminum or polyvinyl chloride, or the like materials) and is preferably sheathed in elastomer or soft fabric so as to provide a soft, nonabrasive receptacle for supporting the musical instrument. In lieu of a U-shaped receptacle, cradle assembly 78 can have other shapes as appropriate for particular instruments, such as a vertical hook shape to engage under a bow portion of a brass instrument, etc.

Yoke coupling 105, like hollow cylinders 80, 82, comprises a C-clamping structure with a hollow cylinder that is split along a portion of its length so that the diameter of the cylinder may be increased slightly to allow yoke coupling 105 to be slid laterally along support 75, or decreased to clamp yoke coupling 105 at a particular lateral position. In the embodiment shown wherein support 75 is a tube and coupling 105 is cantilevered from support 75, the C-clamped frictional engagement is also preferably sufficient to prevent rotation of yoke coupling 105 on support 75 when tightened down. As with couplings 76, a pair of confronting flanges project outwardly from a side of yoke coupling 105, on either side of the split. Each flange includes a through-bore, which through-bores are coaxially aligned. One of the through-bores preferably has an internal thread for a fastening means 99 that is freely received in the other through-bore. Likewise as discussed above, thumbscrews, butterfly nuts, bail closures and the like can be used. However according to an inventive aspect, preferably the yoke 100 is threaded and is used to draw together the flanges and cinch down the diameter of yoke coupling 105. That is, the U-shaped receptacle portion of yoke 100 bears against a flange having a clearance hole, and the shaft portion of yoke 100 extends through that clearance hole and engages in a thread in the other flange. In this manner, yoke coupling 105 is cinched down by rotating yoke 100 until the coupling is tightly fixed on support 75 and then backing off until the receptacle portion is in the right position to engage the instrument as required. Alternatively, coupling 105 can have a threaded through-bore sized to accept the shaft portion of yoke 100 to further lock coupling 105 rotationally by using the shaft portion of yoke 100 in the manner of a set screw.

Figure 2:
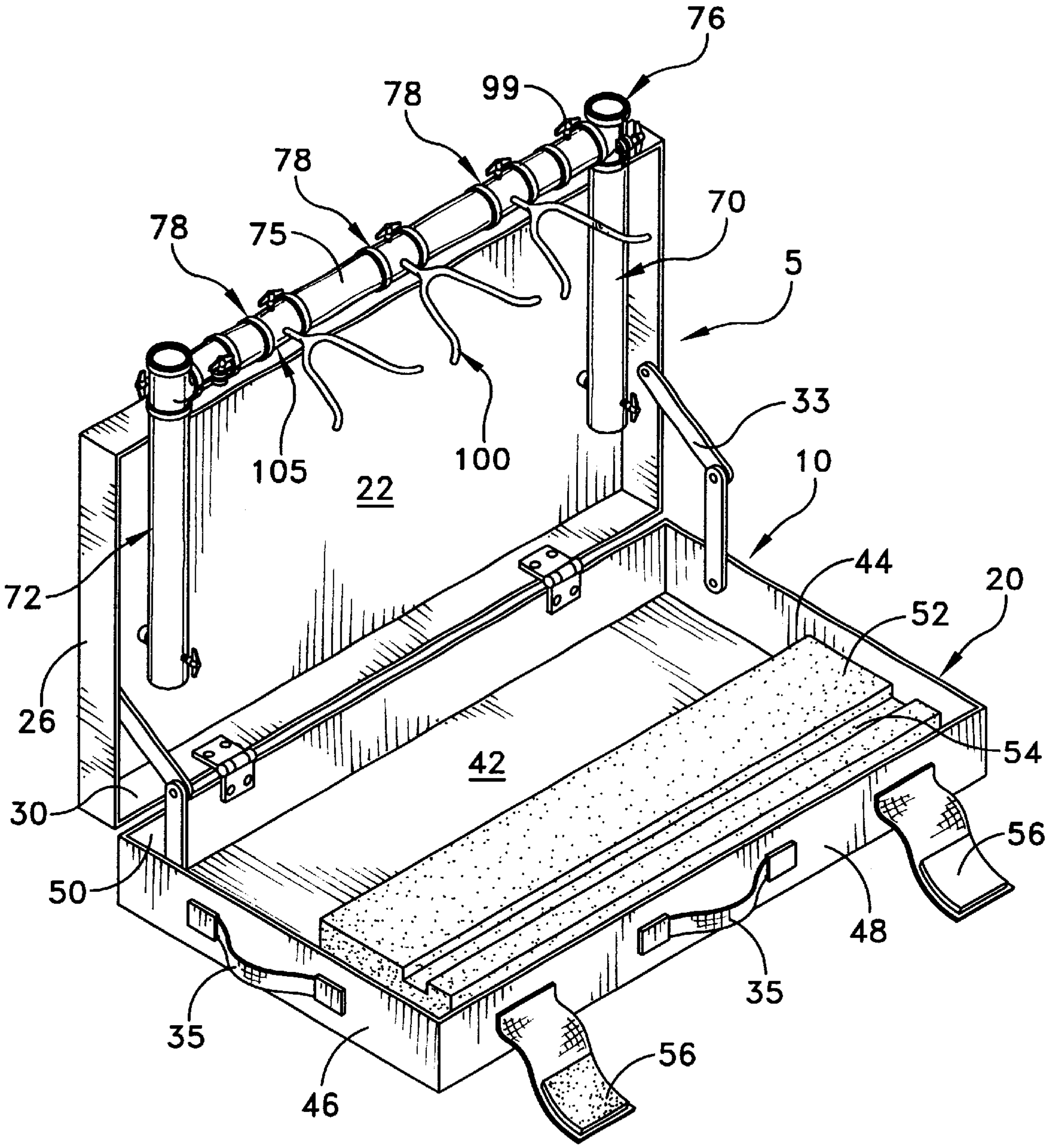
FIG. 2 is a perspective view of the multiple musical instrument stand shown in FIG. 1, as configured for three instruments, for example guitars rotated 90° as compared to FIG. 1.
Figure 3:
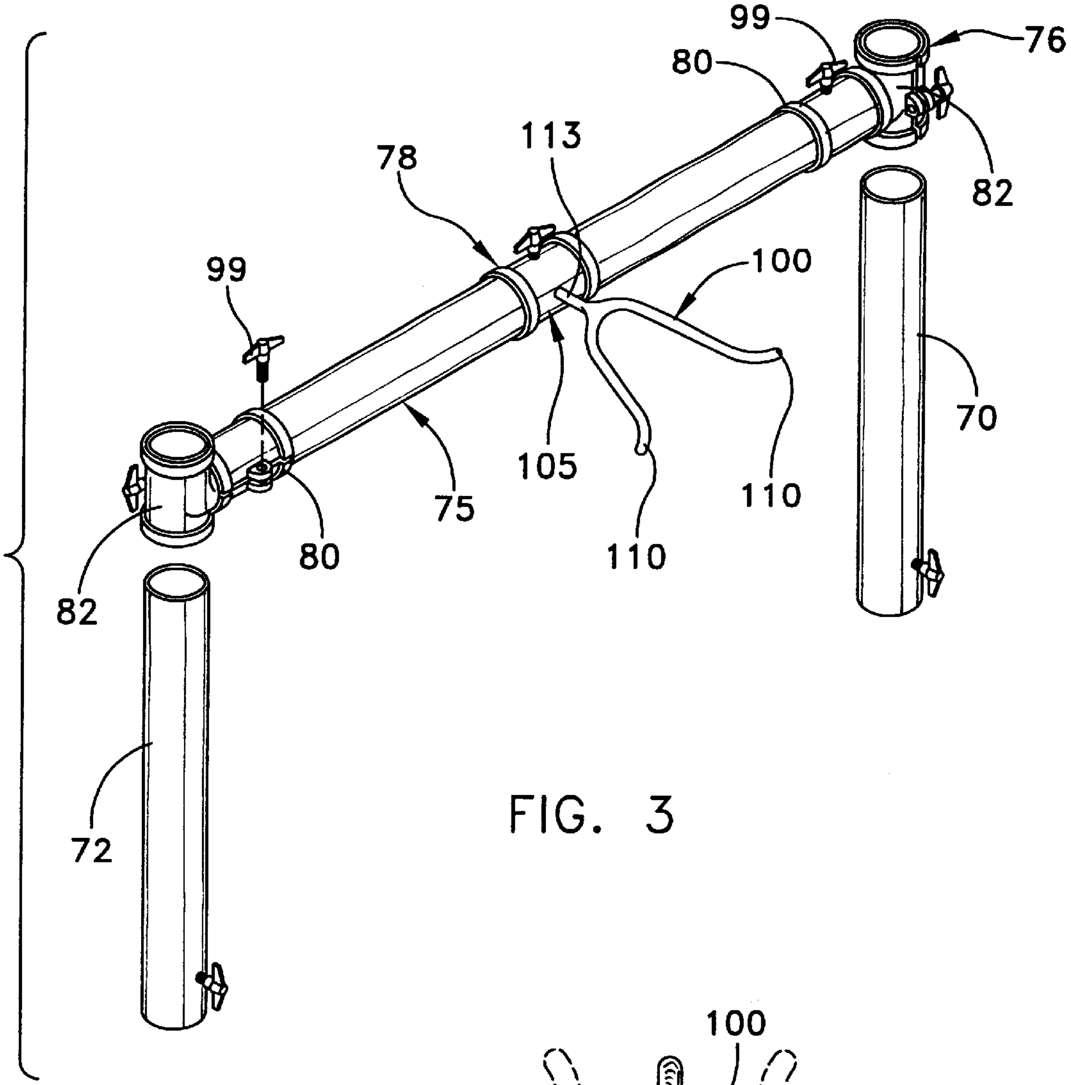
FIG. 3 is an exploded perspective view of the legs, support, and yoke or instrument neck cradle, of the multiple musical instrument stand shown in FIG. 1.
Figure 4:
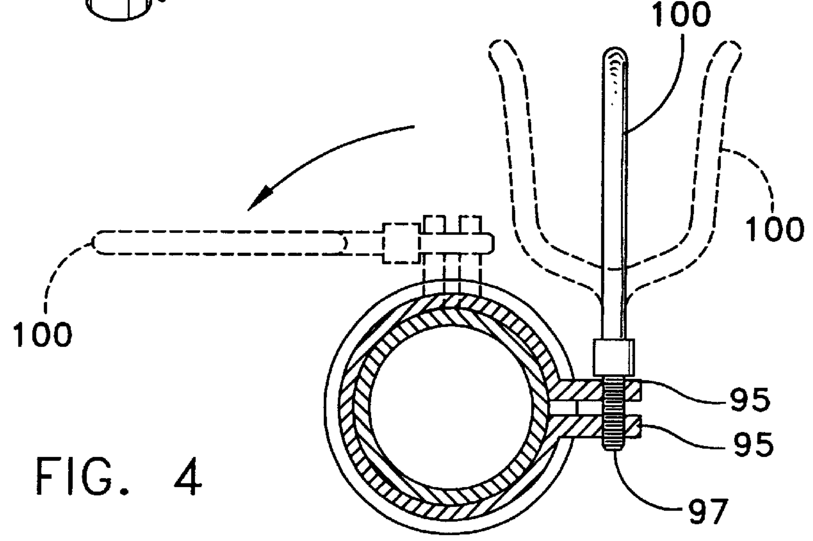
FIG. 4 is a section view through a flanged C-clamp as used according to one embodiment for locking the fittings joining the lateral support to the legs, and in another embodiment for affixing the instrument neck cradle or yoke on the support.
Figure 5:
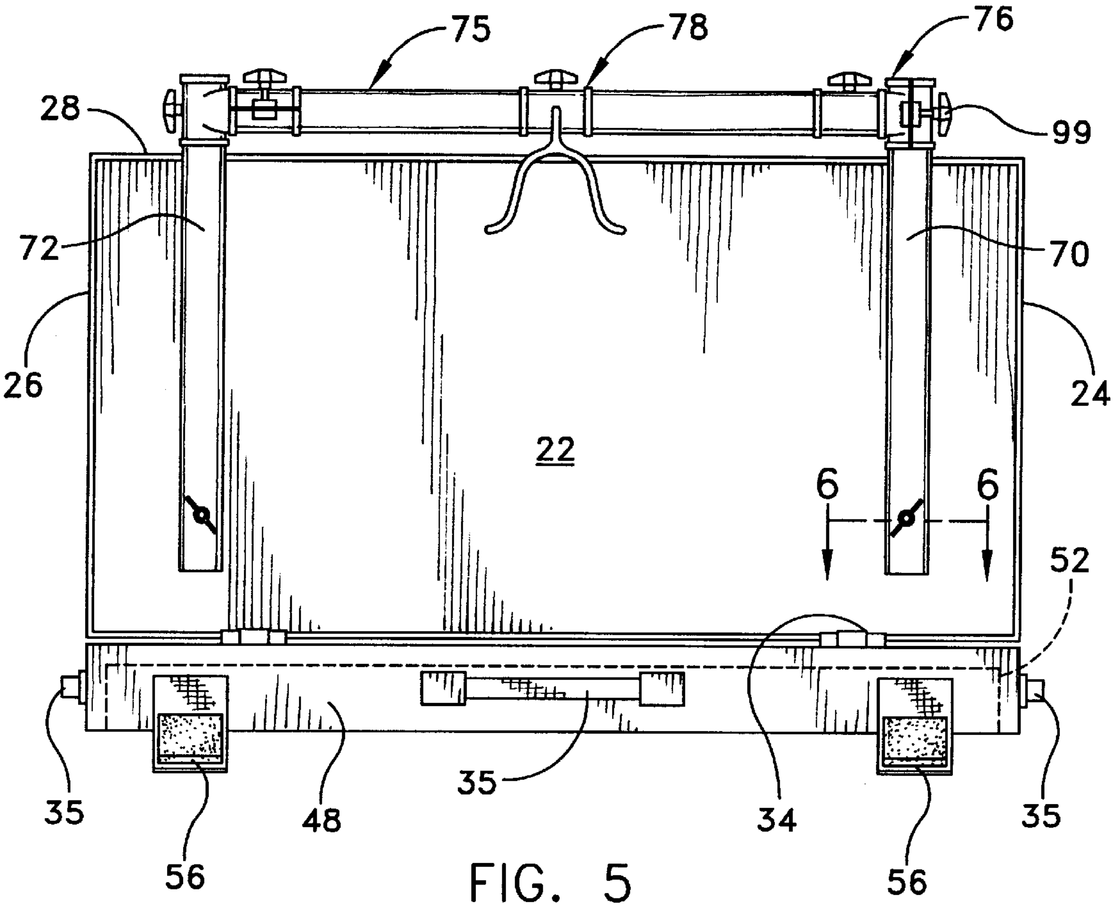
FIG. 5 is a front elevational view of the multiple musical instrument stand shown in FIG. 1.
Figure 7:
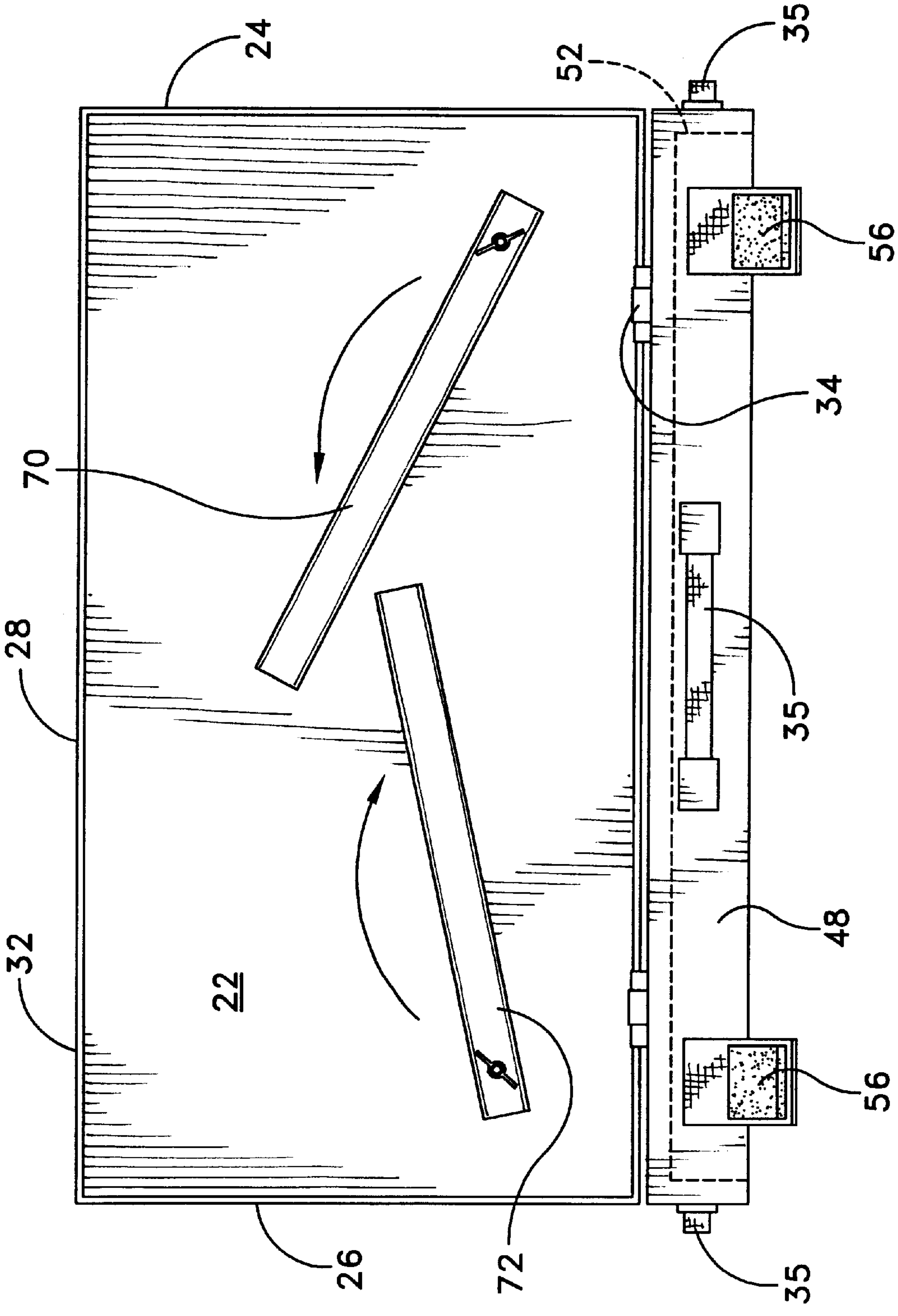

Referring to FIGS. 1, 2 and 5, the stand 5 of the invention is assembled and configured as a multiple musical instrument stand by first opening case 10 such that locking linkages 33 are substantially extended and locked, in known manner, thereby fixing the angle of the top relative to the bottom. The locking linkages 33 also keep the top of case 10 from falling into its closed position. Legs 70 and 72 are rotated from an inclined stowed position within the space defined by the case as shown in FIG. 7, into an upright position relative to center panel 22 as shown in FIGS. 1–3. More particularly, leg 70 is rotated about T-screw 99 and mounting bracket 23 in a clockwise direction as viewed in FIG. 7; leg 72 is rotated about its corresponding T-screw 99 and mounting bracket 23 in a counterclockwise direction, and T-screws 99 are tightened if necessary to hold the legs upright.

In the upright position, legs 70, 72 are each aligned with cut-out 32 in the front wall of top 22. T-screws 99 in brackets 23 urge legs 70, 72 against the top 22. Whereas brackets 23 and the upper ends of legs 70, 72 are spaced, legs 70, 72 are more or less resiliently displaceable due to resilience of the top adjacent to bracket 23 where the brackets are attached. At their opposite or free ends the legs 70, 72 are resiliently snapped into cut-outs 32. T-screws 99 can be tightened into mounting brackets 23 or loosened so as to affix legs 70 and 72 in the upright position shown in FIGS. 1, 2, and 5 with appropriate resilience for snapping the legs into the cutouts.

In the embodiment shown, legs 70,72 have support couplings 76 adjustably disposed along their length. Couplings 76 can be placed loosely on the legs prior to placement of legs 70, 72 in cut-outs 32. Support couplings 76 can be moved to a distal end of each leg 70, 72 or placed at an intermediate point, and attached to the ends of support 75 when legs 70, 72 are rotated into position in cut-outs 32. At the ends of legs 70, 72, support couplings 76 are positioned adjacent to the outer surface of front wall 28 of top half 18. It is also possible (e.g., for a shorter instrument) for support couplings 76 to be positioned below front wall 28 and inside of top half 18. In this way, multiple musical instrument stand 5 may be arranged to accept relatively larger or smaller musical instruments.

Each end of lateral support 75 initially is placed loosely within a cylinder 80,82 of each support coupling 76. Additional T-screws 99 are engaged in flanges 95 of support couplings 76 (see FIG. 4), so that a split is formed in cylinder 80 and by tightening the T-screws, coupling 76 is cinched down tightly and is frictionally fixed to prevent rotation of support 75.

One or more cradle assemblies 78 is normally positioned on support 75 prior to installation of support 75 in coupling supports 76. One, two, three, or more cradle assemblies 78 may be positioned at a chosen lateral position along support 75, so as to allow for a plurality of musical instruments to be stored in multiple musical instrument stand 5. For example as shown in FIG. 1, two cradle assemblies are relatively widely spaced to support two guitars oriented face forward. Several cradle assemblies can be used to similarly support more than two guitars in an edge-forward orientation. It will also be understood that support couplings 76 may be shifted upwardly or downwardly along legs 70, 72 to appropriately engage various musical instruments having different sizes or lengths. To place a musical instrument in multiple musical instrument stand 5, the musician places an upper portion of the musical instrument between guide fingers 110 of yoke 100 and places the lower end against pad 52 in the bottom of stand 5, either against the outside inner edge of pad 52 facing the hinge side of stand 5, or in a slot 54 in pad 52. Pad 52 only extends part of the distance between the front edge of stand 5 and the hinge side, and thereby provides a convenience space for storage of support 75 and its end fittings, as well as other articles such as music stands, audio wiring and other materials.

Instrument stand 5 may be disassembled and stored by reversing the foregoing process and positioning support 75 either within slot 54 of pad 52 or in the space between pad 52 and rear wall 50 of bottom half 20.

It is to be understood that the present invention is by no means limited to the precise constructions herein disclosed and shown in the drawings, but also comprises any modifications or equivalents within the scope of the claims.

What is claimed is:

1. A musical instrument stand adapted for holding at least one musical instrument comprising:

a case having a top half and a bottom half that are pivotally bound together by hinge means such that with the bottom half resting on a horizontal surface, the top half can be pivoted upwardly to substantially a vertical open position; and, a frame mounted to said case, the frame having at least two legs spaced from one another and attached to said top half of said case, and at least one elongated support coupled to and extending between said two legs when said case is in said open position; and, at least one instrument cradle for cradling a portion of said instrument adjacent to the top half of the case when the case is in the open position and the instrument is placed on the bottom half of the case.

2. A musical instrument stand according to claim 1, wherein said instrument cradle includes a yoke comprising a pair of guide fingers and a coupling post wherein said guide fingers project outwardly from an end of said coupling post in spaced parallel relation to one another, and the yoke is movably positionable along the elongated support for determining a lateral position of the yoke relative to the case.

3. A musical instrument stand according to claim 2, wherein said yoke is sheathed in an elastomer so as to provide a soft, nonabrasive receptacle for supporting a portion of said musical instrument.

4. A musical instrument stand according to claim 3, wherein said cradle assembly includes the yoke coupling comprising a hollow cylinder that is split along a portion of its length so that the diameter of the cylinder may be increased slightly to allow for coaxial slidable mating with said support and including a pair of confronting flanges projecting outwardly from a side of said yoke coupling, one on each side of said split wherein each flange includes a through-bore, which through-bores are coaxially aligned and one of said through-bores includes an internal thread for accepting fastening means and further including a yoke mounting flange projecting outwardly from the surface of said yoke coupling and including a through-bore that is sized to accept said coupling post of said yoke.

5. A musical instrument stand according to claim 4, wherein the fastening means comprises the yoke extending through and being threaded to said confronting flanges, such that the confronting flanges are brought together by rotating the yoke for frictionally clamping the cradle assembly on said support.

6. A musical instrument stand adapted for holding at least one musical instrument comprising:

a case having a top half and a bottom half that are pivotally bound together by hinge means so that said top half and said bottom half are (i) pivotable away from one another about said hinge means so as to define an open position of said case, and (ii) pivotable toward one another about said hinge means so as to define a closed position of said case;

a frame mounted to said case and comprising at least two legs each being pivotally fastened in spaced relation to one another to said top half of said case so as to be capable of pivoting between (i) a first substantially vertical position when said case is in said open position, and (ii) a second substantially horizontal position when said case is in said closed position;

said frame further comprising at least one support coupled to and extending between said two legs when said case is in said open position and having at least one instrument cradle assembly adapted for cradling a portion of said instrument; and, wherein said top half and said bottom half of said case each comprise a center panel, a front wall and a rear wall projecting inwardly from a peripheral edge so as to define a portion of an interior compartment of said case that can carry the frame when the case is in said closed position.

7. A musical instrument stand according to claim 6, wherein said upper half of said case includes two semi-circular cut-outs defined in said front wall.

8. A musical instrument stand according to claim 7, further comprising a pair of flaps extending across outer surfaces of said front walls of said top half and said bottom half so as to cover said semi-circular cut-outs in said front wall of said top half.

9. A musical instrument stand according to claim 8, further comprising fastening means located adjacent to said cut-outs, and wherein said flaps include fastening means for releasably engaging the fastening means located adjacent to said cut-outs.

10. A musical instrument stand according to claim 6, wherein said top half and said bottom half of said case are complementarily shaped and proportioned.

11. A musical instrument stand according to claim 6, further comprising a pad disposed on said center panel of said bottom half of said case wherein said pad is spaced from a hinge side of the center panel of the bottom half, defining an edge of the pad for supporting said musical instrument.

12. A musical instrument stand according to claim 6, further comprising a pad disposed on said center panel of said bottom half of said case wherein said pad includes at least one discrete slot for receiving a portion of a musical instrument.

13. A musical instrument stand adapted for holding at least one musical instrument comprising:

a case having a top half and a bottom half that are pivotally bound together by hinge means so that said top half and said bottom half are (i) pivotable away from one another about said hinge means so as to define an open position of said case, and (ii) pivotable toward one another about said hinge means so as to define a closed position of said case;

a frame mounted to said case and comprising at least two legs each being pivotally fastened in spaced relation to one another to said top half of said case so as to be capable of pivoting between (i) a first substantially vertical position when said case is in said open position, and (ii) a second substantially horizontal position when said case is in said closed position;

said frame further comprising at least one support coupled to and extending between said two legs when said case is in said open position and having at least one instrument cradle assembly adapted for cradling a portion of said instrument; and, wherein said at least one support includes two support couplings comprising two hollow cylinders affixed to one another such that their central axes are perpendicular to one another wherein each cylindrical portion of each support coupling is split along a portion of its length so that the diameter of each of said cylinders may be increased slightly to allow for coaxial mating of said cylinder with one of said legs, said support couplings further including a pair of confronting flanges that project outwardly from a side of each cylinder one on each side of said split and including coaxially aligned through-bores wherein one of said through-bores includes an internal thread for accepting releasable fastening means.

14. A musical instrument stand for holding at least one musical instrument comprising:

a case having a top and a bottom connected together by hinges and pivotable between an open position and a closed position of the case;

a frame having at least two legs extending substantially vertically on the top of the case when the case is in the open position;

wherein the frame includes at least one laterally elongated support attachable to the legs, the support extending substantially horizontally when attached to the legs in the open position of the case; and, at least one instrument cradle assembly adapted for cradling a portion of said instrument, the cradle assembly being adjustable in position at least one of laterally and vertically.

15. A musical instrument stand according to claim 14, wherein the legs and the support fit within the case in the closed position.

16. A musical instrument stand according to claim 14, wherein the legs pivot on spaced apart mounting brackets on the top half of the case.

17. A musical instrument stand according to claim 16, wherein the legs fit into cut-outs defined in a front wall of the top half of the case.

18. A musical instrument stand according to claim 14, wherein said cradle assembly includes a yoke for engaging the instrument, positionable laterally along the support.

* * * * *